United States Patent [19]

DeCaprio et al.

[11] 3,865,900

[45] Feb. 11, 1975

[54] CATIONIC DYEABLE NYLON 6 CONTAINING ALKALINE METAL SALTS OF POLY{2-METHYL-2-((1-OXO-2-PROPENYL) AMINO)-1-PROPANESULFONIC ACID}

[75] Inventors: Joseph Donald DeCaprio, Hopewell; John Christopher Haylock; Robert Allen Lofquist, both of Richmond, all of Va.

[73] Assignee: Allied Chemical Corporation, New York, N.Y.

[22] Filed: Mar. 1, 1974

[21] Appl. No.: 447,188

[52] U.S. Cl. ............... 260/857 UN, 8/21 B, 8/178 R, 260/78 A, 260/79.3 M, 260/561 S
[51] Int. Cl. .......................................... C08g 41/04
[58] Field of Search ....................... 260/857 UN

[56] References Cited
UNITED STATES PATENTS

| | | | |
|---|---|---|---|
| 3,506,707 | 4/1970 | Miller | 260/79.3 M |
| 3,531,442 | 9/1970 | Miller | 260/857 UN |
| 3,547,899 | 12/1970 | Arlt | 260/561 S |
| 3,553,286 | 1/1971 | Murata | 260/857 UN |
| 3,665,054 | 5/1972 | Burrows | 260/857 UN |

FOREIGN PATENTS OR APPLICATIONS 995,802   6/1965   Great Britain

*Primary Examiner*—Paul Lieberman
*Attorney, Agent, or Firm*—Richard A. Anderson

[57] ABSTRACT

This invention discloses the method of making nylon 6 cationic dyeable whereby the water soluble alkaline metal salts of poly{2-methyl-2-((1-oxo-2-propenyl) amino)-1-propanesulfonic acid} are added to caprolactam and the mixture subjected to polymerization conditions.

10 Claims, No Drawings

CATIONIC DYEABLE NYLON 6 CONTAINING ALKALINE METAL SALTS OF POLY (2-METHYL-2-(1-OXO-2-PROPENYL) AMINO)-1-PROPANESULFONIC ACID

BACKGROUND OF THE INVENTION

This invention relates to synthetic fiber-forming polycaproamides and shaped articles therefrom which have excellent affinity for cationic dyestuffs.

It is an object of this invention to provide a new and useful polycaproamide. These polycaproamides are useful as shaped articles, particularly fibers which can be made into a textile fabric or carpet. Another object is to provide a shaped polycaproamide article which has increased affinity for cationic dyes.

U.S. Pat. No. 3,506,707 teaches use of the monomer of the alkylamidoalkanesulfonic acids and their salts, i.e., monomers of the polymer additive of this invention, in acrylonitrile copolymers to increase affinity for basic (cationic) dyes. Similarly in British Pat. No. 995,802 the sodium salt of the above sulfonic acid compound is taught as a monomer to be copolymerized with ethylene, then the resulting copolymer added to polyolefins, such as polypropylene to improve dyeability. Cationic dyes are not mentioned in regard to the specific compound.

SUMMARY OF THE INVENTION

The alkaline metal salts of this invention are made either by polymerizing 2-methyl-((1-oxo-2-propenyl)amino)-1-propanesulfonic acid and then neutralizing the polysulfonic acid with such bases as sodium hydroxide, lithium carbonate, or potassium bicarbonate; or preferably, neutralizing the above monomer using such bases as those listed above, and then polymerizing the salt. The monomer, as the acid or as the salt, can be polymerized by free radical initiators or redox systems.

The monomer can be copolymerized with other ethylenic monomers to adjust the water solubility of the polymer which is produced. Examples of comonomers are acrylonitrile N-vinylpyrrolidone, styrene, styrenesulfonic acid, and ethylenesulfonic acid. Comonomers to be used as the nylon additive should preferably not have ester or amide linkages, to minimize amine-ester or amine-amide interchange.

The preferred molecular weight for the salt is from about 20,000 to about 200,000. Lower molecular weight materials are more easily washed out of the nylon during wet processing and molecular weights above 300,000 are more difficult to handle as aqueous solutions because of a high solution viscosity in concentrated solution.

The pH of the polymeric salt must be adjusted to between 5.5 and 9. At lower pH's the salt decomposes to give a discolored polymer. At higher pH's polymerization of the nylon in inhibited.

Other polysulfonic acids can be made by polymerization of the acrylamidoalkanesulfonic acids disclosed in U.S. Pat. No. 3,506,707.

The polymeric sulfonate is preferably added to the caprolactam as an aqueous solution. Then this mixture together with light stabilizeres, such as manganese salts, polymer molecular weight regulators such as acetic acid, azelaic acid, or 5-sulfoisophthalic acid and delustrants if desired, is subjected to polymerization conditions. The preferred concentration of sulfonates present is between 60 and 150 equivalents per $10^6$ grams of polymer, but higher concentrations can be used in a master batch.

Polymerization is done under conditions normally employed for the preparation of nylon 6. The polymer can be formed under stream pressure to initiate polymerization, and then held under atmospheric pressure until the desired degree of polymerization is reached. The polymer either is subjected to high vacuum to boil off the unreacted monomer, or is extruded as strands which are then pelletized and water-extracted to remove unreacted monomer.

The polymer chips can be spun and drawn into yarn using spinning systems well known in the art.

The drawn yarn has excellent affinity for cationic dyes, as will be shown in the following examples.

It is important in the practice of this invention to minimize the polymerization time of the nylon 6 which contains the subject polysulfonates. This is because as polymerization time increases the concentration of sulfonates retained through washing and drying steps decreases. This is believed to be due to an interchange between the amide link of the nylon and the amide link in the acrylamide portion of the polysulfonate. Any such interchange could create low molecular weight derivatives of taurine which could be washed out.

DESCRIPTION OF THE PREFERRED EMBODIMENTS

This invention is a fiber-forming synthetic linear polycaproamide receptive to cationic dyes, containing from about 50 to 300 gram equivalents per $10^6$ grams of polymer, as sulfonate, of an alkaline metal salt of poly{2-methyl-2-((1-oxo-2-propenyl)amino)-1-propanesulfonic acid}. The preferred amount is 60 to 150 gram equivalents per $10^6$ grams of polymer. The preferred molecular weight of the salt is 20,000 to 200,000. The method of this invention is adding the above salts to the polycaproamide, preferably to the caprolactam prior to polymerization, and shaping the polycaproamide into a shaped article, such as by spinning to a fiber or yarn.

EXAMPLE 1

0.1 Gram of ethyl 2-mercaptoacetate was dissolved in 100 ml of water. 100 Grams of 2-methyl-2-((1-oxo-2-propenyl)amino)-1-propanesulfonic acid was added. The solution was purged with nitrogen. 0.01 Gram of ferrous sulfate and 0.25 cc of a 0.05 percent solution of hydrogen peroxide was added. The solution thickened. The viscous solution which had become warm was allowed to cool, and was then neutralized with about 17.8 grams of lithium carbonate in 100 ml of water. 72.8 Grams of this solution was added to 1,520 grams of caprolactam at 90°C. 0.0576 Gram of manganese chloride and 0.164 grams of a 50 percent solution of hypophosphorous acid were added to serve as light stabilizers, and 6.8 grams of sebacic acid was added as a molecular weight regulator.

This solution was poured into a 3-liter glass reactor equipped with an agitator and heated by means of a heating mantle. 80 Grams of e-aminocaproic acid was added as a polymerization initiator. The vessel was then closed and nitrogen was passed over the melt. The mixture was then raised to a temperature of 255°C. over a period of 1½ hours.

At the end of eight hours at 255°C. a light yellow homogeneous polymer ribbon was extruded from the bottom of the reactor and pelletized. Unreacted caprolactam was then removed from the polymer pellets by hot water extraction. The washed and dried polymer was found to have a relative formic acid viscosity of 31, with 82 carboxyl equivalents and 19 amine equivalents per million grams of polymer. Sulfur was analyzed by x-ray fluorescence, and found to be 1,924 parts per million (ppm). The sulfur content of the unwashed polymer was found to be 2,288 ppm.

This polymer was spun using an extruder to feed a gear pump, which forced the polymer through a 14-hole spinnerette. The yarn produced had a Y cross-section. Spinning temperature was about 260°C. Pressure drop across the sand filter in the spin pot was within the normal range of spinning pressures.

The undrawn yarn had a total denier of about 700. Five ends of this yarn were gathered and drawn to 3.2 times the spun length and then two-plied to give a yarn of 2,240 total denier. The yarn had a tensile strength of 2.9 grams per denier, and an ultimate elongation of 48 percent. A control yarn, pure nylon 6, which was spun at the same time had a tensile strength of 3.3 grams per denier and an ultimate elongation of 53 percent.

A comparative yarn was made from a nylon 6 polymer which had a relative formic acid viscosity of 46, about 90 carboxyl equivalents, about 25 amine equivalents, and about 81 sulfonate groups per $10^6$ grams of polymer, obtained by the addition to caprolactam of 81 moles of 5-sulfoisophthalic acid, and 50 moles of hexamethylenediamine per $10^6$ grams of caprolactam. (The combination of 5-sulfoisophthalic acid and hexamethylenediamine forms a salt which is insoluble in caprolactam as disclosed in U.S. Pat. No. 3,709,865, while no insoluble salt is formed by the use of the above polysulfonate).

This comparative yarn was spun and drawn as was the polymer described above. Both yarns were then knitted into sleeves. They were then heat set by stream treating in an autoclave at 230°F. for five minutes, followed by three 10-minute cycles of stream treatment at 270°F.

The yarns were then dyed in separate dye baths to a moss green shade in a dye bath composed as follows:

0.3 percent (O.W.F.) Sevron Yellow 8GMF (DuPont) C.I. Basic Yellow 53

0.25 percent (O.W.F.) Sevron Blue GCN (DuPont) C.I. Basic blue 97

2.0 percent (O.W.F) Hipochem PND-11 (amine salt of an alcoholester)

1.0 percent (O.W.F) Hipochem CDL-60 (nonionic surfactant)

and monosodium and/or disodium phosphate to adjust the pH of the dye bath to 7.0 ± 0.2. The structure of these dyes are as follows:

Sevron Yellow 8GMF

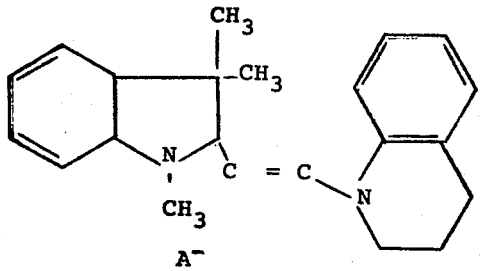

where A is an anion;
Sevron Blue GCN

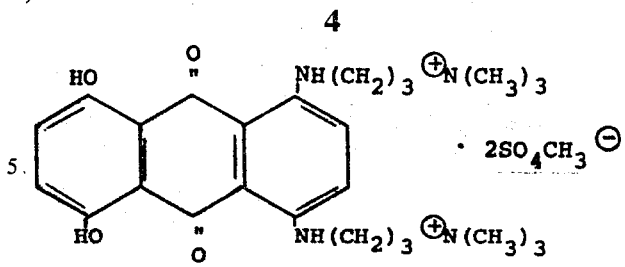

The basic dye pick up for the two sleeves was comparable, showing good affinity for cationic dyes.

EXAMPLE 2

28.7 Grams of the sodium salt of poly{2-methyl-2((1-oxo-2-propenyl)amino)-1-propanesulfonic acid} of about 50,000 molecular weight was dissolved in 100 ml of water, and added to 1,520 grams of caprolactam at 90°C. Manganese chloride, hypophophorous acid and sebacic acid were added, as in Example 1, to serve as light stablizers, and molecular weight regulators, respectively.

This solution was poured into a 3-liter glass reactor and subjected to polymerization conditions as in Example 1.

The mixture was held at 255°C., with stirring for 6 hours. Then a colorless homogeneous polymer ribbon was extruded from the bottom of the reactor, and cut into pellets. These pellets were leached in boiling water to remove extractables. Analysis of the washed and dried polymer showed a relative formic acid viscosity of 63, with 56 carboxyl equivalents and 30 amine equivalents per $10^6$ grams of polymer. Sulfur analysis showed 2,436 parts per million sulfur. The polymer before washing had 2,554 parts per million sulfur, showing a higher retention of sulfur than Example 1.

This polymer was spun on equipment described in Example 1. The spinning temperature was 255°C. Pressure drop across the spin pot was 4,400 psi. Undrawn denier was 710. Five ends of this yarn were gathered together, drawn and then 2plied to give a yarn of 2,255 total denier. The drawn yarn had an ultimate elongation of 50 percent, and a tensile strength of 3.3 grams per denier. A yarn similar to the comparative yarn of Example 1, which contained 5-sulfoisophthalic acid, sodium salt had an ultimate elongation of 58 percent and a tensile strength of 3.1 grams per denier.

The yarn made from the polysulfonate and the comparative yarn were knitted into sleeves, heat set by autoclaving at 270°F., and then dyed in separate dye baths having a composition the same as that described in Example 1. The shade of both dye sleeves appeared identical, showing good affinity of the yarns for cationic dyes.

EXAMPLE 3

A polymer was made similar to that described in Example 2, but using 93 grams of a 30 percent aqueous solution of the lithium salt of poly{2-methyl-2-((1-oxo-2-propenyl)amino)-1-propanesulfonic acid}, of about 50,000 molecular weight, instead of the dry sodium salt of the polysulfonate.

After a polymerization time of 5 hours the polymer was extruded and pelletized. The pelletized polymer was washed and dried. The analysis showed a relative formic acid viscosity of 50.6, with 87 carboxyl equivalents and 22 amine equivalents per $10^6$ grams of polymer. Sulfur analysis showed 2,619 parts per million parts polymer. The polymer contained 2,820 ppm sulfur before washing.

This polymer, and a polymer containing 5 sulfoisophthalate were spun and drawn as described in Example 1. Spinning and drawing conditions were as follows:

|  | Spin Temperature | Spin Pressure | Undrawn Denier | Drawn Denier | Ultimate Elongation | Tensile Strength |
|---|---|---|---|---|---|---|
| Polysulfonate polymer | 271 | 4800 | 620 | 2011 | 36% | 2.4 |
| Polymer with 5-sulfoisophthalate | 245 | 2900 | 718 | 2478 | 51% | 2.6 |

The two yarns above were knitted into sleeves, heat set by autoclaving at 270°F. and then dyed in separate dye baths described in Example 1. The depth of shade of both sleeves showed good affinity for cationic dyes.

EXAMPLE 4

A polymer was made like Example 3, but using 279 grams instead of 93 grams of a 30 percent aqueous solution of the lithium salt of poly {2-methyl-2-((1-oxo-2-propenyl)amino)-1-propanesulfonic acid}, of about 50,000 molecular weight.

After a polymerization time of 4½ hours the polymer was extruded from the reactor and pelletized. After washing and drying the polymer analysis showed a relative formic acid viscosity of 38.5, with 101 carboxyl equivalents and 30 amine equivalents per million grams of polymer. Sulfur analysis showed 7,930 ppm sulfur.

One part of this polymer was mixed with two parts of a polymer having a relative formic acid viscosity of about 70, with 70 carboxyl equivalents and 20 amine equivalents per million grams of polymer, and no sulfur content.

The polymer was spun and drawn as described in Example 1. The yarn was knitted into sleeves autoclaved and dyed as described in Example 1. The sleeve showed good affinity for cationic dyes.

EXAMPLE 5

70 Grams of a 30 percent aqueous solution of the lithium salt of poly {2-methyl-2-((1-oxo-2-propenyl)amino)-1-propanesulfonic acid}, of about 50,000 molecular weight was added to 1,520 grams of caprolactam at 90°C. 0.0576 Grams of manganese chloride and 0.164 grams of a 50 percent solution of hypophosphorous acid were added to serve as light stabilizers, and 9.5 grams of the sodium salt of 5-sulfoisophthalic acid was added.

This solution was poured into a 3-liter glass reactor and polymerized as described in Example 1. After 7¾hours on temperature the polymer was extruded from the reactor and pelletized. After the unreacted monomer was removed by washing and drying, the polymer was analyzed and shown to have a relative formic acid viscosity of 57.5, with 72 carboxyl equivalents, and 21 amine equivalents per million grams of polymer. The sulfur analysis showed 2,400 ppm sulfur.

The polymer was spun and drawn as described in Example 1. The yarn was knitted into sleeves, autoclaved, and dyed as described in Example 1. The sleeve showed good affinity for cationic dyes.

We claim:

1. A fiber-forming synthetic linear polycaproamide receptive to cationic dyes, containing from about 50 to about 300 gram equivalents per $10^6$ grams of polymer, as sulfonate, of an alkaline metal salt of poly{2-methyl-2-((1-oxo-2-propenyl)amino)-1-propane-sulfonic acid}.

2. The polycaproamide of claim 1 wherein said polycaproamide contains from about 60 to about 150 gram equivalents per $10^6$ grams of polymer, as sulfonate, of said salt.

3. The polycaproamide of claim 1 wherein said salt has a molecular weight of from about 20,000 to about 200,000.

4. The polycaproamide of claim 1 wherein said salt is present as a comonomer in a copolymer with a monomer selected from the group consisting of acrylonitrile, N-vinylpyrrolidone, styrene, styrenesulfonic acid, and ethylenesulfonic acid.

5. In a method to make a fiber-forming synthetic linear polycaproamide receptive to cationic dyes, the improvement comprising
adding to said polycaproamide from about 50 to about 300 gram equivalents per $10^6$ grams of polymer, as sulfonate, of an alkaline metal salt of poly-2-methyl-2-((1-oxo-2-propenyl)amino)-1-propanesulfonic acid, and
shaping said polyamide into a shaped article.

6. The method of claim 5 wherein said salt has a molecular weight of from about 20,000 to about 200,000.

7. The method of claim 5 wherein said salt is added in an amount of from about 60 to 150 gram equivalents per $10^6$ grams of polymer.

8. The method of claim 5 wherein said salt is added to caprolactam and said caprolactam is then polymerized.

9. The method of claim 5 wherein said salt is added in solution having a pH of between about 5.5 and about 9.

10. The method of claim 5 wherein said salt is added as a comonomer in a copolymer with a monomer selected from the group consisting of acrylonitrile, N-vinyl-pyrrolidone, styrene, styrene sulfonic acid, and ethylene-sulfonic acid.

* * * * *